(12) United States Patent
Borstel et al.

(10) Patent No.: US 6,512,781 B1
(45) Date of Patent: Jan. 28, 2003

(54) GAS LASER WITH MODE CONTROL

(75) Inventors: Michael Von Borstel, Pleidelsheim (DE); Mark Geschwandner, Corlingen (DE); Tanja Behrends, Ditzingen (DE)

(73) Assignee: Trumpf Lasertechnik GmbH, Ditzingen (DE)

( * ) Notice: Subject to any disclaimer, the term of this patent is extended or adjusted under 35 U.S.C. 154(b) by 0 days.

(21) Appl. No.: 09/943,969

(22) Filed: Aug. 31, 2001

(30) Foreign Application Priority Data

Aug. 31, 2000 (EP) ............................ 00118825

(51) Int. Cl.$^7$ ............... H01S 3/098; H01S 3/22; H01S 3/08

(52) U.S. Cl. .................... 372/19; 372/55; 372/103

(58) Field of Search .................. 372/19, 20, 99, 372/103, 107, 55

(56) References Cited

U.S. PATENT DOCUMENTS

| 4,491,950 A | | 1/1985 | Hoffmann |
| 4,951,285 A | * | 8/1990 | Cole et al. .................... 372/19 |
| 5,020,895 A | | 6/1991 | Giesen et al. |

FOREIGN PATENT DOCUMENTS

| GB | 2117558 | * 10/1983 | ............. H01S/3/03 |
| JP | 59029481 | 2/1984 | |

* cited by examiner

*Primary Examiner*—Paul Ip
*Assistant Examiner*—Armando Rodriguez
(74) *Attorney, Agent, or Firm*—Pepe & Hazard LLP

(57) ABSTRACT

A gas laser (1) has an optics system and a mode-masking diaphragm in the beam guiding chamber of the laser resonator. The optics system is adjustable between two settings in each of which any higher-order modes of the laser beam (3) are masked out. The Gaussian mode (9) can be generated in one of the two settings, and the ring mode (10) in the other setting. An appropriate control permits switching between Gaussian and ring modes depending upon the intended processing operation.

11 Claims, 3 Drawing Sheets

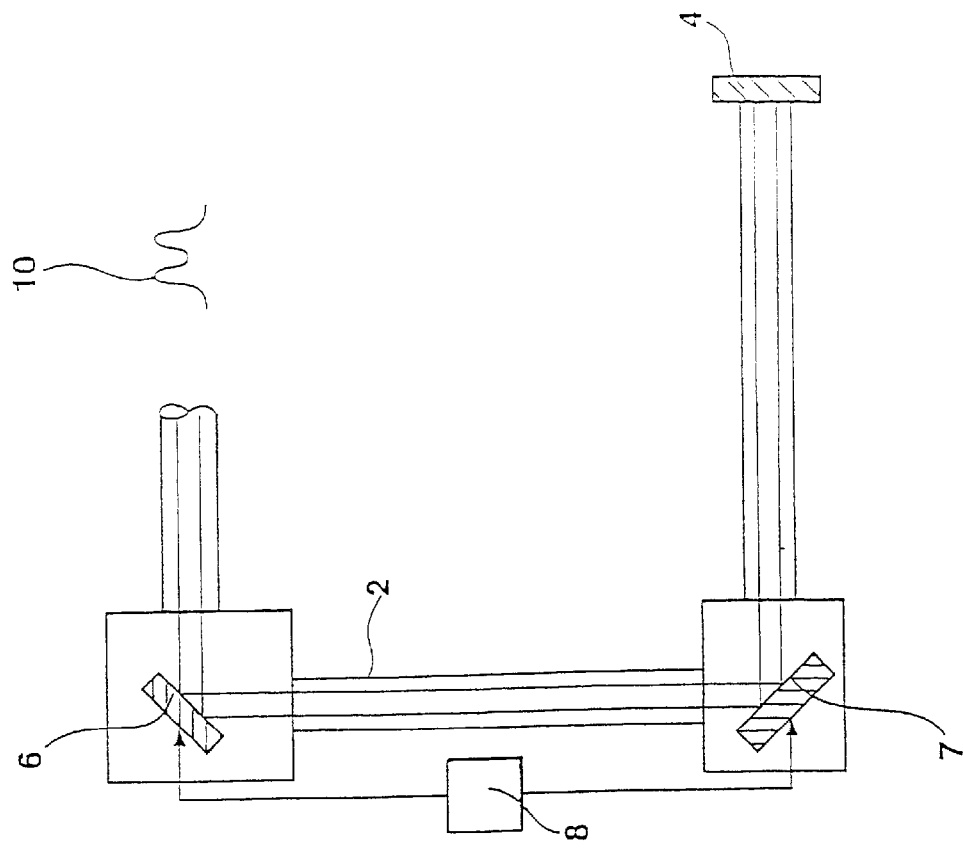
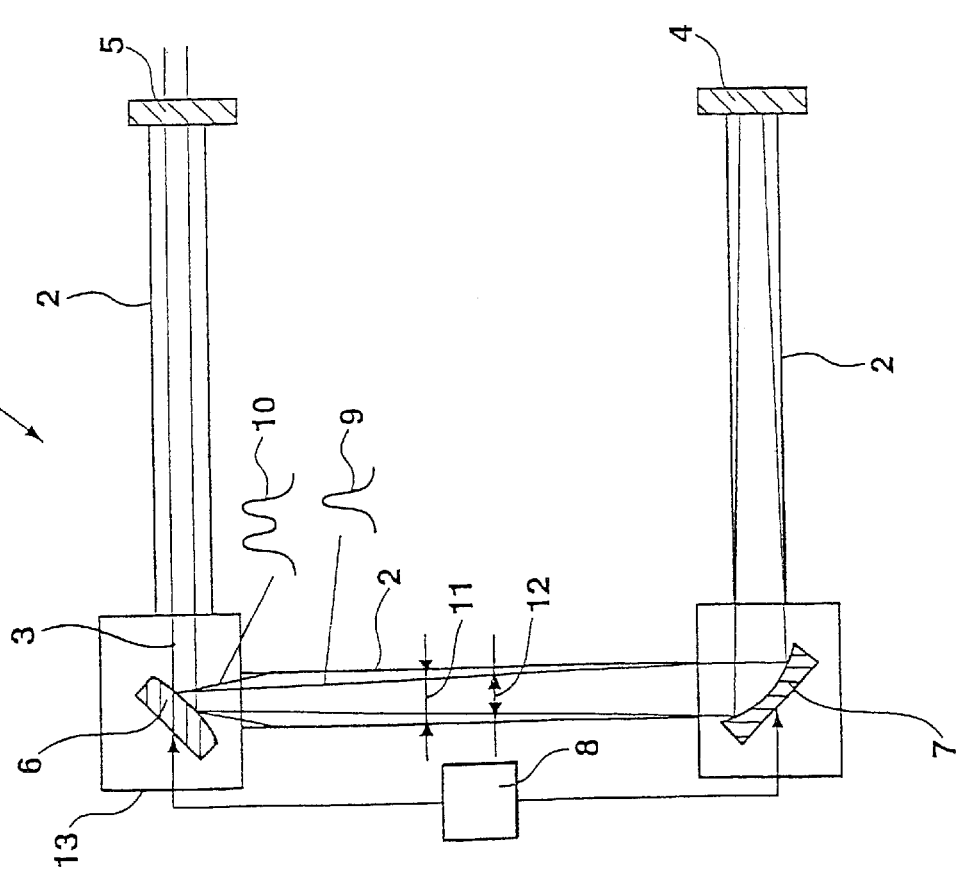

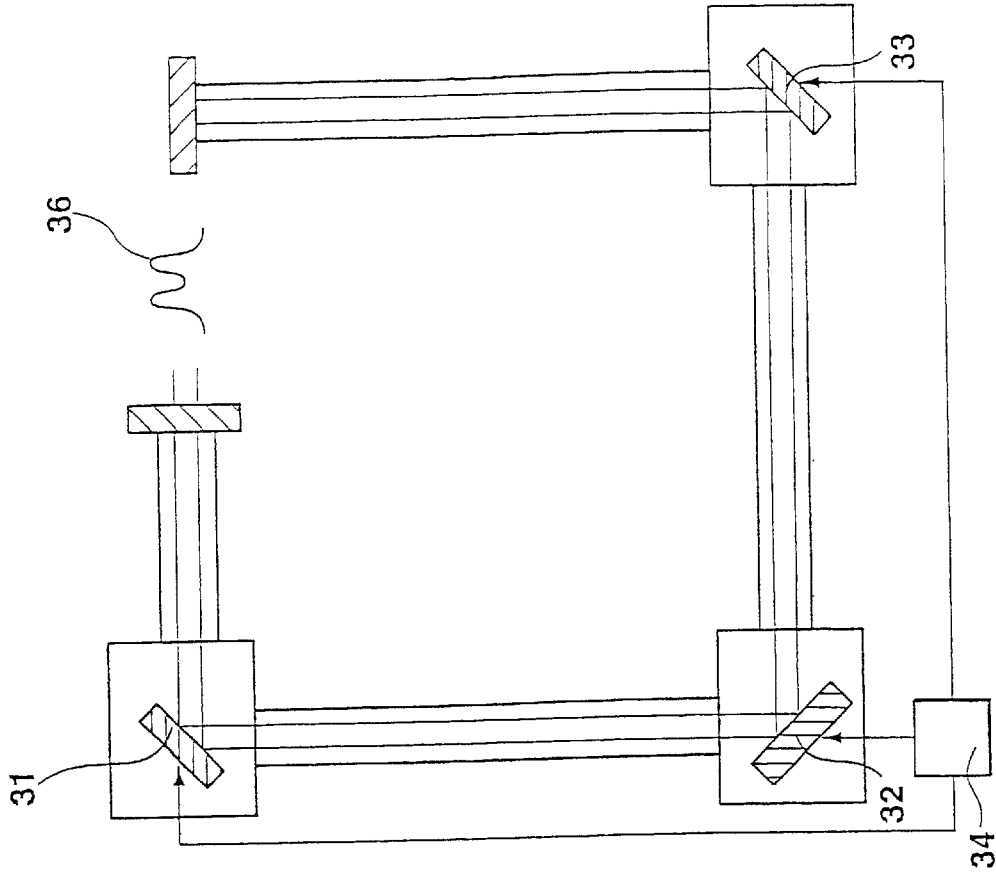
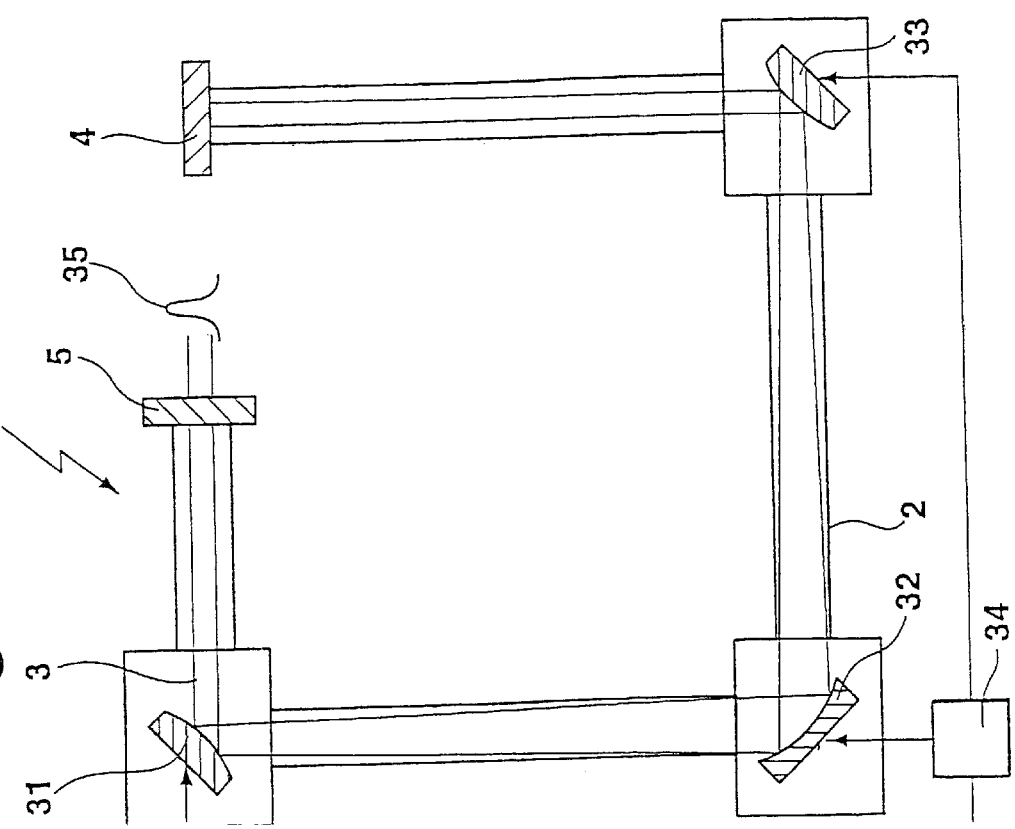

GAS LASER WITH MODE CONTROL

BACKGROUND OF THE INVENTION

This invention relates to a gas laser with an optics system and with a mode-masking diaphragm in the beam guiding chamber of the laser resonator.

Lasers of this type have been previously known and are described, for example, in EP 0 492 340.

A gas laser usually generates in its laser resonator a characteristic oscillation state, called the mode, which is essentially determined by the length of the laser resonator, the diameter of the laser tube(s) and the configuration of the electrodes. The design of a laser, and thus the type of mode it generates, depends on the intended application. For materials processing there are two modes of particular significance—the $TEM_{00}$ mode (the so-called "Gaussian mode") and the $TEM_{01*}$ mode (the so-called "ring mode").

The Gaussian mode permits focussing down to the smallest possible spot diameter, a desirable feature for cutting thin sheet metal. The ring mode is more difficult to focus than the Gaussian mode, and generally results in a larger diameter for the focal spot. This is desirable for instance when cutting thicker sheet metal since the cutting width is large enough to permit the dross to be blown out. At the center of the ring mode beam, there is a power minimum, reducing the thermal load in the center of the optical elements, a feature which is important, particularly in the case of high-power systems.

Numerous attempts have been made in the past to set the mode in the laser resonator of a gas laser in a defined manner. The design described the above-mentioned EP 0 492 340 employs as its mode-masking diaphragm, two longitudinally adjustable aperture disks in the laser resonator by which the diameter of the laser beam can be reduced. In an initial setting, the two mode selector disks are positioned outside the laser beam, allowing the full diameter of the beam to exit unobstructed to the outside mirror. In a second setting, both mode diaphragm disks protrude into the beam path, reducing the diameter of the laser beam by about one half. A mechanically complex cylinder drive serves to move the mode diaphragm disks in the longitudinal direction.

In contrast thereto, it is the object of this invention to provide a novel gas laser with a relatively simple structure to enable simple switching between two different modes for different applications.

SUMMARY OF THE INVENTION

It has now been found that the foregoing and related objects may be readily attained in a gas laser having an optics system and a mode-masking diaphragm in the beam guiding chamber of the laser resonator. The optics system includes at least two adaptive optical elements adjustable between two settings, and the mode-masking diaphragm has an aperture which is disposed between the adaptive optical elements which are selectable between either of two settings, in each of which the mode-masking diaphragm masks out any higher-order modes from the laser beam.

Desirably, in at least one of the two settings of the adjustable optical elements of the optics system, one adaptive optical element serves to expand the laser beam while another adaptive optical element performs the subsequent focussing of the laser beam. Preferably, in at least one of the two settings of the optics system, two adaptive optical elements serve to expand the laser beam while a third adaptive optical element (32) focuses the laser beam.

The adaptive optical elements are selected from the group comprising the output mirror of the laser resonator, the retro-mirror of the laser resonator, and one or more interpositioned beam deflectors.

The function of the mode-masking aperture is provided by the inner diameter of a circular cross section of the beam guiding chamber. In one embodiment, the circular section of the beam guiding chamber is provided by one or more laser tubes of the laser resonator. In another embodiment, the circular section of the beam guiding chamber is provided by a connecting block linking two adjacent laser tubes. In one of the settings of the mode-masking diaphragm, the laser resonator is configured for generating a Gaussian mode and in the other setting the resonator is configured for generating a ring mode.

The laser also has a control device for setting the mode-masking diaphragm and the optics system, and at least two sets of parameters are stored in the control device for the two settings of the mode-masking diaphragm and optics system.

The advantage of the present invention lies in the fact that it makes it possible to generate in the laser resonator the Gaussian mode in one setting and the ring mode in the other setting, by a suitable control device which permits switching between the Gaussian and the ring mode as required for the intended application.

The switchable optics system preferably incorporates at least one adaptive optical element such as an adaptive mirror whose reflective surface can change shape for instance when the pressure of the cooling water is varied. This allows for the appropriate selection of the respectively desired curvature of the adaptive mirror by means of a control device.

The term "adaptive optical element" as employed herein refers to mirrors and other optical elements of the laser assembly which can be modified in configuration or optical properties through the controlled application of external forces such as those which would change the temperature water pressure, piezoelectric or mechanical forces. Illustrative of such devices is the temperature cooling water pressure controlled mirror illustrated and described in Giesen et al U.S. Pat. No. 5,020,895 granted Jun. 4, 1991.

In at least one of the two optical element settings, one or two adaptive optical elements, preferably convex, serve as the laser beam expander while another adaptive optical element, preferably concave, serves for the subsequent focussing of the laser beam.

For the adaptive optical elements it is possible to use elements that are already parts of the optical path in the laser resonator, for instance the output mirror and/or the retro-mirror of the laser resonator and/or one or several beam deflectors. If the retro-mirror is to be used for beam expansion or focussing, the fact must be taken into account that, usually, it already has a curvature to assure a stable laser resonator. The final curvature of the retro-mirror is then defined by simply adding the two curvatures together, with due consideration being given to the respective sign. Actively operable optical elements include, for instance, a minimum of two neighboring adaptive beam deflectors, possibly in conjunction with the retro-mirror. The preferred configuration of actively operable optical elements consists of three adaptive beam deflectors.

Experiments with a double-squared convolution resonator have revealed that with at least two optical elements particularly good results are obtained, meaning a laser beam in the Gaussian mode with a particularly high beam quality, when one of the optical elements, especially when convex, is designed to expand the laser beam while the other optical element, especially when concave, serves for the subsequent focussing of the laser beam. Experiments with a double-squared convolution resonator have also revealed that with at least three optical elements particularly good results are obtained, i.e. a laser beam in the Gaussian mode with a particularly high beam quality, when two of the optical elements, especially when convex, serve to expand the laser beam while the other optical element, especially when concave, serves to focus the laser beam. The radius of the one concave optical element is preferably smaller than each of the radii of the convex optical elements while the radii of the convex optical elements are essentially matched. Particularly good results, i.e., a laser beam in the Gaussian mode with an especially high beam quality, can be obtained when one convex beam deflector is located near the output mirror or when the output mirror is itself convex and the radii of the convex or concave mirrors are in the range from 10 m to 60 m.

In particularly preferred design versions of the invention, the mode-masking aperture consists in the inside diameter of a round section of the beam guiding chamber. The advantage of this concept is that, in contrast to an aperture disk, there is no excited laser gas outside the excitation area defined by the round section of the beam guiding chamber, i.e. outside the mode masking aperture, which might otherwise give rise to undesirable amplification. Consequently, a crisp Gaussian mode can be generated in the laser resonator. Given the adjustable optics, the laser beam can be expanded within the beam guiding chamber to a beam diameter of a magnitude where the inside diameter of the round section of the beam guiding chamber acts as the mode diaphragm for masking out higher-order modes.

In particularly preferred design versions of the invention, the laser resonator is so configured that in one setting of the mode diaphragm and the optics it generates a Gaussian mode while in the other setting it generates a ring mode. This concept permits the selective setting of the laser mode with the aid of beam-expanding and focussing optical elements in the laser resonator, in the process of which the laser beam is shaped by these optical elements in such fashion that the round section of the beam guiding chamber of the laser resonator itself functions as the mode-masking aperture when the laser beam is expanded. Depending on the intended processing operation, a suitable control device can switch between the Gaussian and the ring mode. To that end, at least two sets of parameters for the two settings of the mode diaphragm and the optics may be stored in the control device.

Other advantages offered by this invention are evident from the description and the drawing. According to the invention, the features referred to above and those explained further below may be applied individually or in any desired combination. The design versions described and illustrated are not to be viewed as a finite and final enumeration but rather as examples serving to explain this invention.

BRIEF DESCRIPTION OF THE DRAWINGS

FIG. 1a diagrammatically illustrates a first embodiment of a gas laser of the present invention, with two adaptive optical elements for generating a Gaussian mode;

FIG. 1b shows the adaptive optic elements of FIG. 1a in a non-operative position for generating a ring mode;

FIG. 3a illustrates a third embodiment of the gas laser of the present invention with three adaptive optical elements for generating a Gaussian mode; and FIG. 3b shows the adaptive optical elements of FIG. 3a in an alternate position for generating a ring mode.

DETAILED DESCRIPTION OF THE PREFERRED EMBODIMENT

Figure 2B:
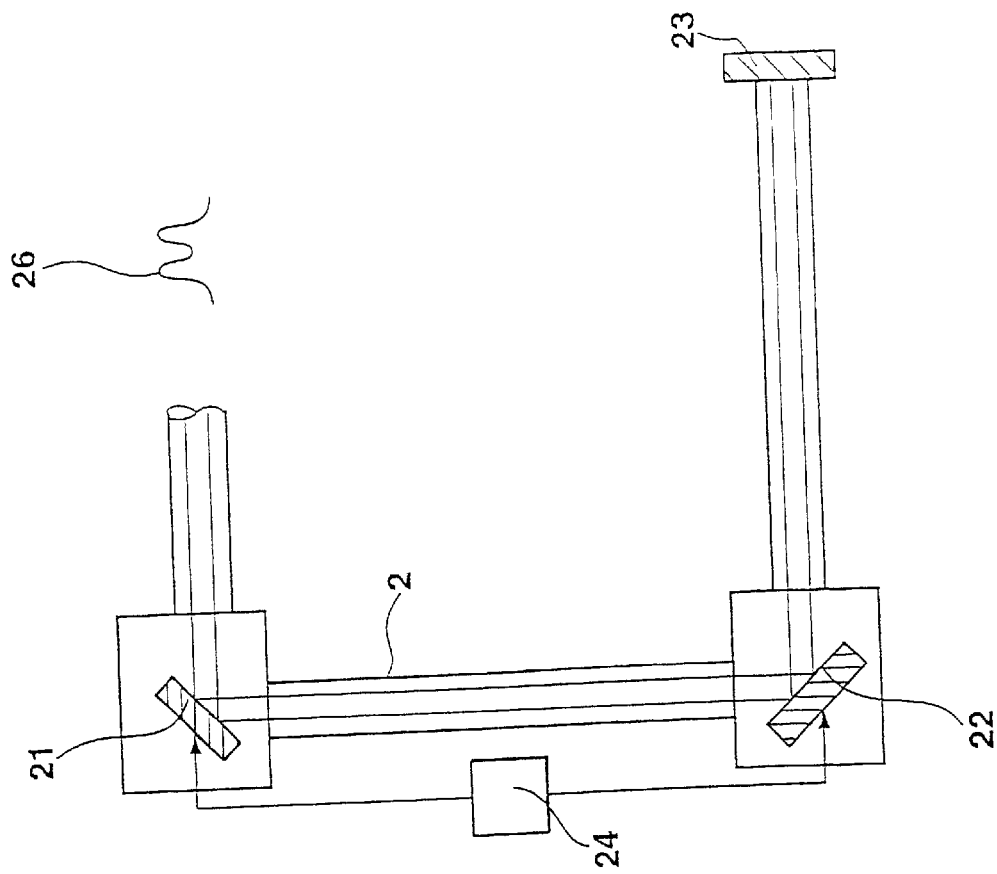
FIG. 2b shows the adaptive optical elements of FIG. 2a in an alternate position for generating a ring mode.

The laser resonator of the gas laser 1 illustrated in FIG. 1 includes three laser tubes 2 which serve as the enclosure for a lasing gas such as $CO_2$ or CO. The laser tubes have a round cross section and may consist of quartz or of a ceramic material. Any two juxtaposed laser tubes extend at a right angle relative to each other, for a combined U-shaped configuration. The laser beam 3 generated in the laser resonator is reflected between a planar (flat) retro-mirror 4 and a planar (flat) output mirror 5 and is redirected at 90° angle between any two laser tubes 2 by the beam deflectors 6, 7.

The optical path of the laser beam 3 is indicated in greatly simplified fashion. The two beam deflectors 6, 7 are adaptive mirrors with a variable radius of curvature which can be selected by means of a control device 8.

From the output mirror 5 in the embodiment of FIG. 1a, the laser beam 3 is expanded by the beam deflector 6 to provide a in convex surface to a point where, with the exception of the Gaussian mode 9, all other modes of the laser beam 3 including especially the ring mode 10 are masked out of the laser beam 3 by the central laser tube 2. The beam diameter 11 of the laser beam 3 in the central laser tube 2 is thus trimmed to the inner diameter 12 of the central laser tube 2, i.e., the central laser tube 2 functions as the mode aperture. There is no excited laser gas outside the mode area, as a result of which a sharply defined Gaussian mode 9 is generated in the laser resonator.

The beam deflector 7 with a concave surface, refocuses the expanded laser beam 3 to a point where the laser tube 2 located between the beam deflector 7 and the retro-mirror 4 will not act as a mode aperture for the Gaussian mode. The same applies to the laser tube 2 located between the output mirror 5 and the beam deflector 6. In this embodiment, two neighboring laser tubes 2 are linked by a connecting block 13 which is part of the laser resonator.

In FIG. 1b, the adaptive beam deflectors 6, 7 are set to function as plane mirrors so that the laser beam 3 is not expanded within the central laser tube 2. The architecture of the laser resonator is such that, in this case, it generates the ring mode 10. Simple "switching" of the contour of the adaptive mirrors 6, 7 allows the selective generation of the Gaussian mode 9 or ring mode 10 in the laser resonator.

Figure 2A:
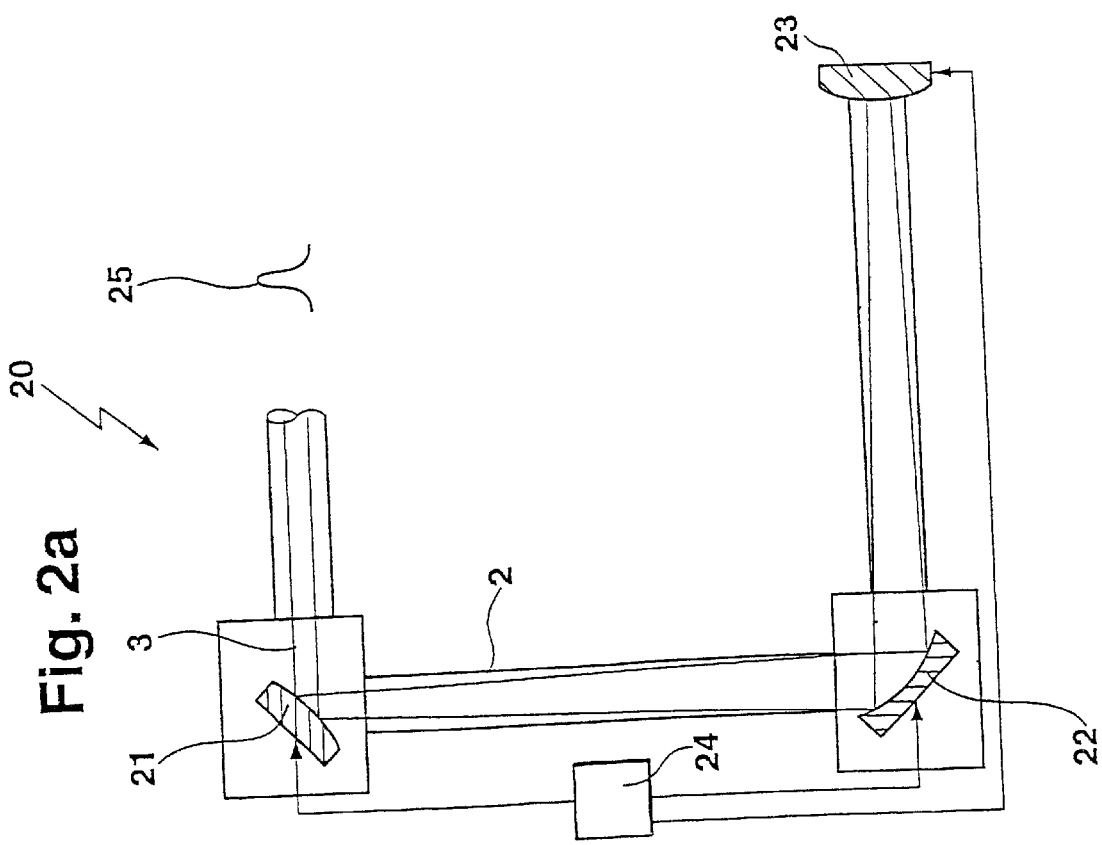
FIG. 2a diagrammatically illustrates a second embodiment of the gas laser of the present invention with three adaptive optical elements for generating a Gaussian mode.

For switching between the Gaussian mode and the ring mode, the gas laser 20 depicted in FIG. 2 employs two adaptive beam deflectors 21, 22 and one adaptive retro-mirror 23, and their settings are respectively determined by the control device 24. In the configuration of FIG. 2a which has convex and concave beam deflectors 21, 22 and a convex retro-mirror 23, the laser beam 3 is expanded in the central laser tube 2 for mode-limiting and, accordingly, only the Gaussian mode 25 is generated by the laser resonator. In the reconfiguration of FIG. 2b, the beam deflectors 21, 22 and the retro-mirror 23 are set to act as planar (flat) mirrors so that no expansion of the laser beam 3 takes place within the central laser tube 2. Thus, the architecture of the laser resonator is such that in this case it generates the ring mode 26. Simple "switching" of the adaptive mirrors 21, 22, 23 allows the selective generation of the Gaussian mode 25 or the ring mode 26 in the laser resonator.

For switching between the Gaussian mode and the ring mode, the gas laser 30 illustrated in FIG. 3 employs three adaptive beam deflectors 31, 32, 33, and their respective contours are determined by the control device 34. In the configuration of FIG. 3a, using the combination convex beam deflectors 31, 33 and a concave beam deflector 32, the laser beam 3 is expanded in the laser tube 2 for mode-limiting and correspondingly only the Gaussian mode 35 is generated in the laser resonator. The radii of curvature of the beam deflectors 31, 32, 33 are so chosen that they compensate for astigmatic errors. In the configuration of FIG. 3b, all beam deflectors 31, 32, 33 are set to act as plane mirrors so that no expansion of the laser beam 3 takes place within the laser tube 2. The architecture of this laser resonator generates a ring mode 36.

Thus, it can be seen that simple "switching" of the adaptive mirrors 31, 32, 33 allows the selective generation of the laser beam in the Gaussian mode 35 or the ring mode 36 in the laser resonator.

Having thus described the invention, what is claimed is:

1. A gas laser (1,20,30) having an optics system and a mode-masking diaphragm in the beam guiding chamber of the laser resonator, said optics system including at least a pair of adaptive optical elements disposed at opposite sides of said mode masking diaphragm and adjustable between :two settings, said mode-masking diaphragm having an aperture which masks out any higher-order modes from the laser beam (3)passing therethrough in either of said settings, in at least one of the two settings of said adjustable optical elements of said optics system, one adaptive optical element (6, 21, 31) serves to expand the laser beam (3) while another adaptive optical element (7, 22, 32) performs the subsequent focussing of the laser beam (3).

2. The gas laser in accordance with claim 1, wherein said optics system includes a third adaptive optical element, and in which in at least one of the two settings of the optics system, two adaptive optical elements (31, 33) serve to expand the laser beam (3) while a third adaptive optical element (32) focuses the laser beam (3).

3. The gas laser in accordance with claim 1, in which the adaptive optical elements are selected from the group comprising the output mirror (5) of the laser resonator, the retro-mirror (4,23) of the laser resonator and one: or more interpositioned beam deflectors (6, 7, 21, 22, 31, 32, 33).

4. The gas laser in accordance with claim 1, in which the function of the mode-masking aperture is provided by the inner diameter (12) of a circular cross section of the beam guiding chamber.

5. The gas laser in accordance with claim 4, wherein the circular section of the beam guiding chamber is provided by one or more laser tubes (2) of the laser resonator.

6. The gas laser in accordance with claim 4, wherein the circular section of the beam guiding chamber is provided by a connecting block (13) linking two adjacent laser tubes (2).

7. The gas laser in accordance with claim 1 in which in one of the settings of the adaptive optical elements of said optics system, the laser resonator is configured for generating a Gaussian mode (9,25, 35) and in the other setting the resonator is configured for generating a ring mode (10,26, 36).

8. The gas laser in accordance with claim 1 in which, in one of the settings of said adaptive optical elements of said optics system the laser resonator is configured for generating a Gaussian mode (9, 25, 35) and in the other setting the resonator is configured for generating a ring mode (10,26, 36).

9. The gas laser in accordance with claim 1 including a control device (8, 24, 34) for setting-said adaptive optical elements of said optics system and in which at least two sets of parameters are stored in said control device (8, 24, 34) for the two settings of said optics system.

10. The gas laser in accordance with claim 9 including a control device (8, 24, 34) for setting the mode-masking diaphragm and the optics system and in which purpose at least two sets of parameters are stored in said control device (8, 24, 34) for the two settings of the mode-masking diaphragm and optics system.

11. The gas laser in accordance with claim 1 wherein said adaptive optical elements are set as plane mirrors to generate a laser beam in the ring mode.

\* \* \* \* \*